Jan. 11, 1927.
S. C. NICHOLS
1,614,016
SAP EVAPORATOR
Filed Feb. 9, 1926
3 Sheets-Sheet 1
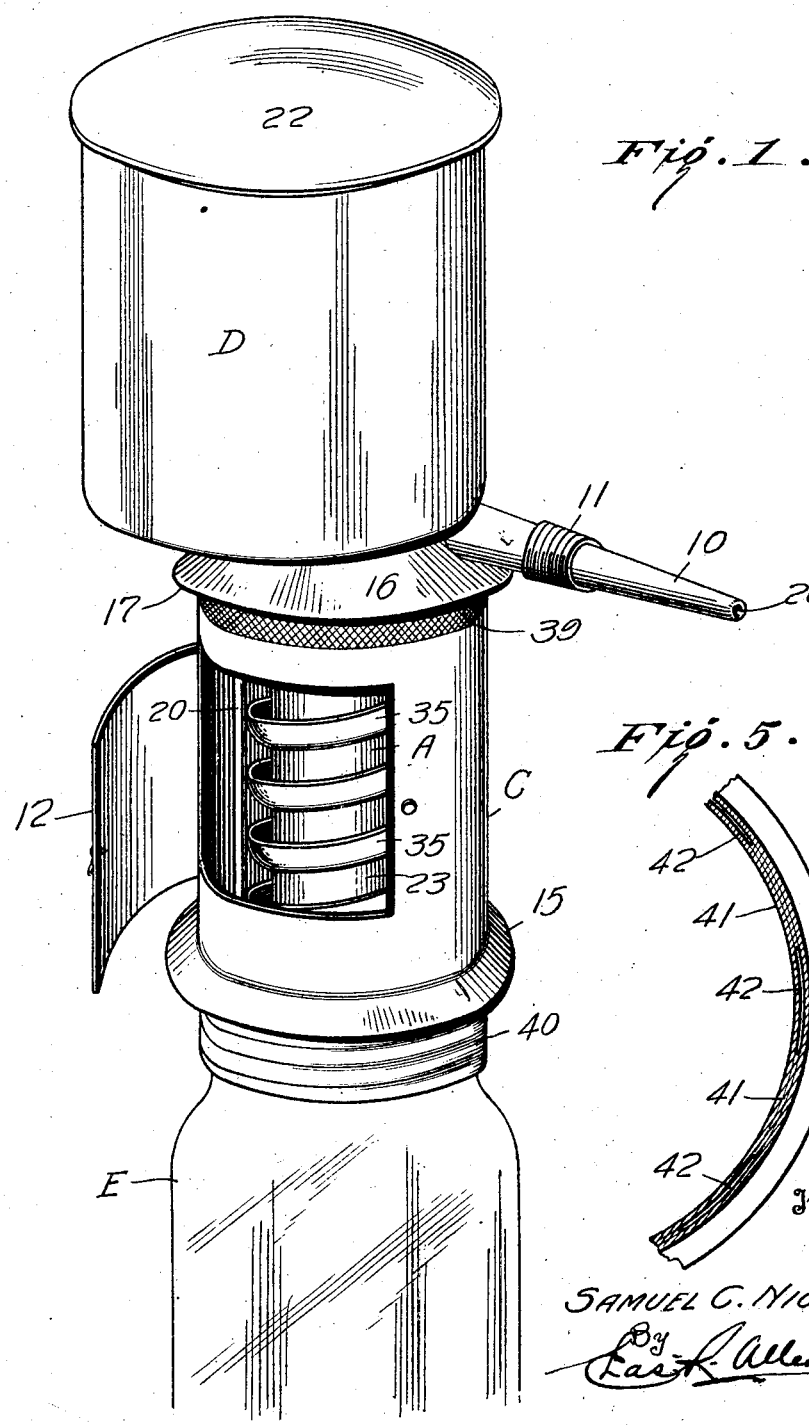
Inventor
SAMUEL C. NICHOLS,
By Earl R. Allen
Attorney

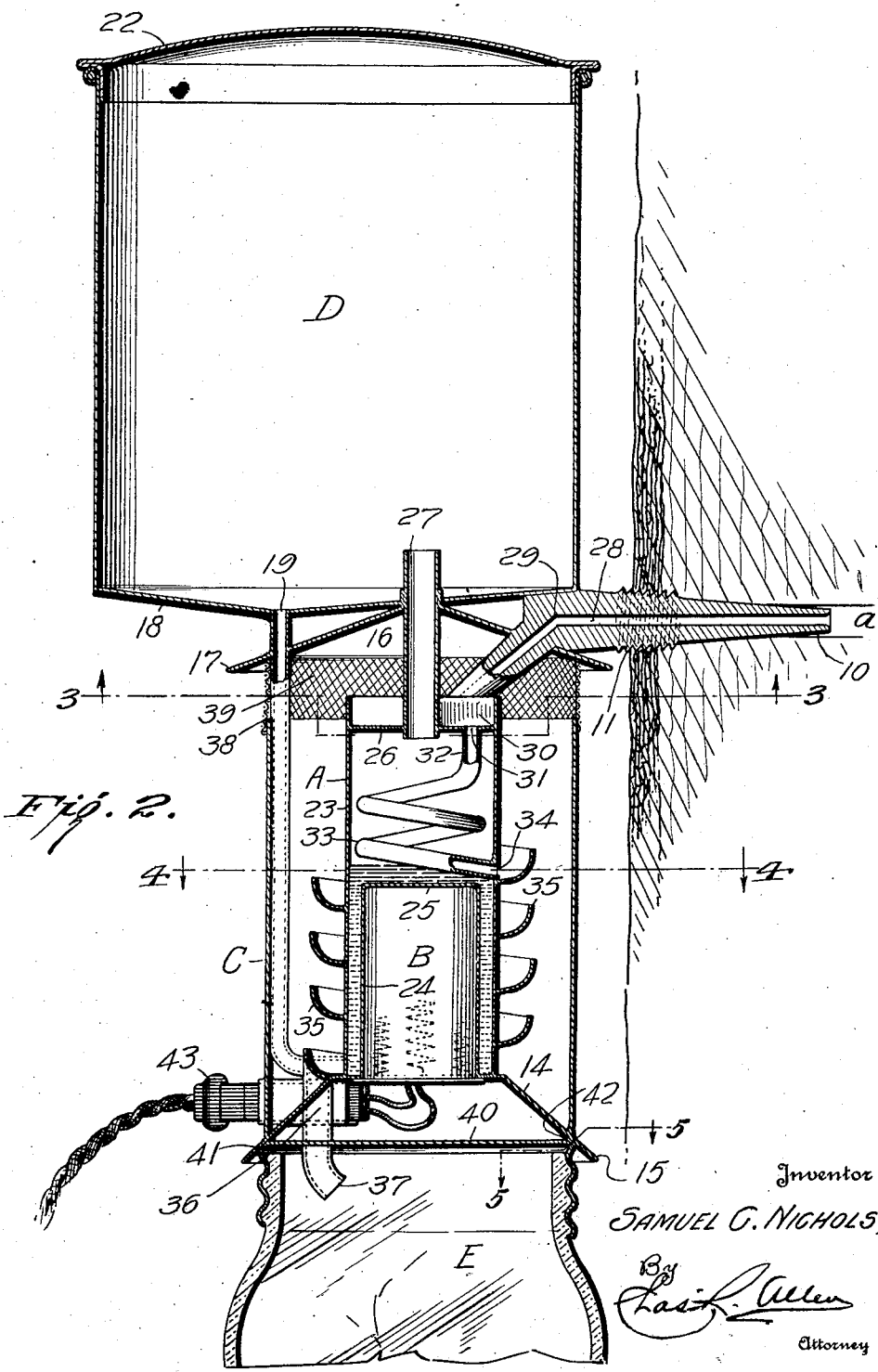

Jan. 11, 1927.  S. C. NICHOLS  1,614,016
SAP EVAPORATOR
Filed Feb. 9, 1926   3 Sheets-Sheet 3
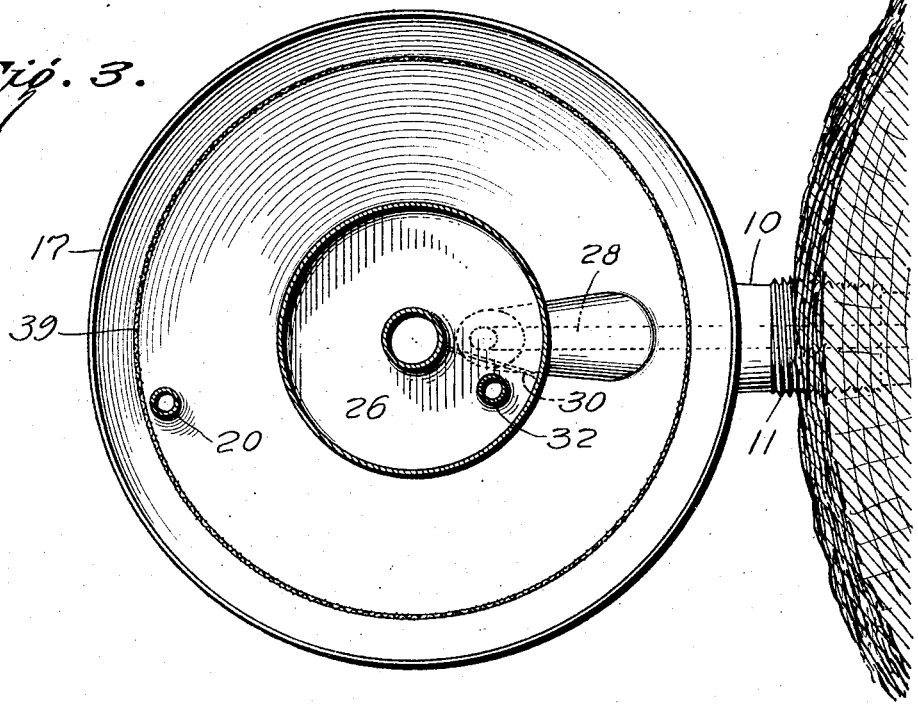
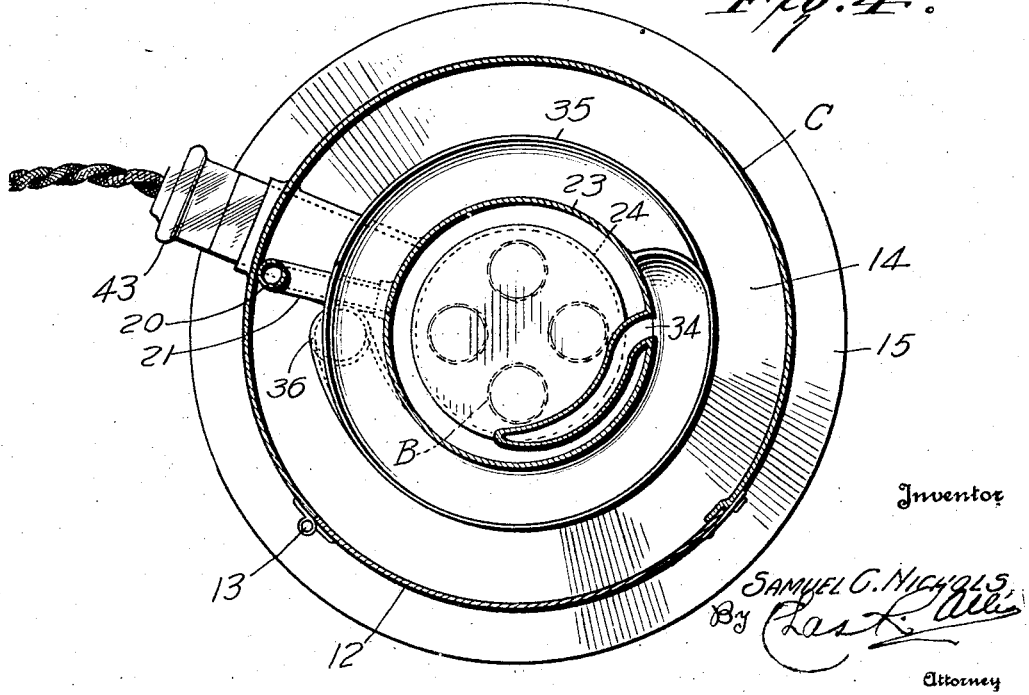
Inventor
SAMUEL C. NICHOLS
By
Attorney Patented Jan. 11, 1927.

UNITED STATES PATENT OFFICE.

SAMUEL C. NICHOLS, OF WADDINGTON, NEW YORK.

SAP EVAPORATOR.

Application filed February 9, 1926. Serial No. 87,108.

My invention relates to a very simple, inexpensive, effective and highly practical device for the evaporation in connection with the manufacture of maple syrup from the sap. In the gathering of sap from sugar maples or the like, great losses are incurred and inconveniences caused due to its dilution with rain water, loss of the sap due to storms or freezing and frequently, the souring of sap before it is gathered with the advent of untimely warm weather, or if the collecting of the sap has been delayed.

To overcome the above and other disadvantages in connection with the gathering of the sap from the trees, I provide a relatively small device which is easily fastened to the tree from which the sap is gathered and which is so constructed as to render the gathering of the sap and its condensation or conversion into a syrup practically without care or attention. It is to be understood that I do not limit myself merely to the details as illustrated and described, but the scope of my invention extends to whatever construction may be defined by or included within the terms or language of the appended claims.

In the drawings:

Figure 1 is a view in perspective of my invention;

Figure 2 is a central, longitudinal section thereof illustrating the application of my device to a tree;

Figure 3 is a transverse sectional view on the line 3—3 of Figure 2 looking in the direction of the arrows;

Figure 4 is a similar view taken on the line 4—4 of Figure 2 and looking in the reverse direction, and Figure 5 is a detail sectional view taken on the line 5—5 of Figure 2.

My invention, in the form or embodiment shown in the drawings and briefly described, comprises a relatively small boiler, A, electrical heating means or coils, B, an outer casing for the boiler, C, a condensing tank, D, and means, E, for receiving the condensed residue in the form of maple syrup.

In applying my improved sap gathering and condensing means to a tree, it is merely necessary to bore or drill a relatively small hole, $a$, a suitable distance into the tree for the purpose of receiving a spile or tapered sap spout, 10, which is provided with a slightly enlarged and screw threaded portion, 11, integrally formed therewith and from which the entire device is supported.

For the purpose of providing a very simple and practical arrangement of parts, I have mounted and grouped the several portions of my improved sap gathering and evaporating means in substantially the same vertical alignment.

The casing, C, which is preferably constructed of sheet metal, is provided with a hinged door, 12, pivoted as at 13, for the purpose of observing the progress of the sap within the boiler and for cleaning when necessary. The bottom, 14, between the boiler and the tank or casing, C, is substantially frustroconical, extending to an edge of a larger diameter and slightly below the bottom of the tank, C, and forming the flange, 15, for the purpose of providing a water shed for the upper portion of the sap receiving reservoir, E, as will be hereinafter more fully described.

Integrally formed with the upper end of the boiler, A, is a conically shaped cover, 16, which extends beyond the outer diameter of the boiler, A, providing a ledge, 17. Superimposed above the boiler, A, and its respective outer casing, C, is the condensing tank, D, which is preferably constructed of sheet metal and of a substantially cylindrical formation. The bottom, 18, of the condensing tank, D, is extended downwardly to a point, 19, where it communicates with the vertically extending tube, 20, for the purpose of directing the condensed vapors back into the boiler, A, through the horizontally disposed bent portion of the pipe, 21, as illustrated in Figures 2 and 4. The condensing tank, D, is provided with a tightly fitting cover or top, 22.

The casing, 23, of the boiler, A, is cylindrical in form, centrally disposed within the casing, C, and is integrally extended above the frustroconical bottom, 14. A concentrically mounted casing, 24, slightly smaller in diameter than the casing, 23, is upwardly extended above the bottom, 14, with which it is integrally connected, for the purpose of providing a uniformly annular water heating space between the outer casing, 24, and the inner side of the casing, 23. To obtain the best results, the water level should be slightly above the upper end, 25, of the casing, 24, as is clearly shown in Figure 2.

Within the inner casing, 24, I preferably locate the heating coils or element, B, which is constructed of a number of coils or windings to obtain the best results, depending upon the output of the electrical current and the number of heaters to be connected on the line. A relatively short distance below the upper end of the boiler or container, A, I provide a partition, 26, and form it integrally with the casing, 23. A vertically mounted tube, 27, is adapted to pass through the partition, 26, and is extended upwardly, projecting through the conical cover, 16, and the bottom, 18, of the condensing chamber, D, for the purpose of permitting the vapors from within the boiler, A, to pass up and into the condensing chamber, D. It will be noted with special reference to Figure 2 that the area of the tube, 27, is several times larger than is the tube, 19, which will permit the vapors to readily pass into the condensing chamber, D.

The central opening or bore, 28, of the spile, 10, is deflected downwardly as indicated at 29, to the upper end of the cylinder or casing of the boiler, A, directing the sap upon the partition plate, 26, on one side of the radially extending vertical partition, 30. On the opposite side of the vertically extending partition plate, 30, an opening, 31, is provided in the partition, 29, for the purpose of connecting the upper end, 32, of the tubular coil, 33. The lower end of the coil, 33, is in open communication with the outer side of the boiler, A, as indicated at 34.

A helically arranged trough, 35, is integrally formed with the outer side of the cylindrical casing, 23, and extends from the outlet opening, 34, downwardly to the upper end of the frustroconical bottom, 14, terminating into the downwardly extending and relatively short tube or pipe, 36, which communicates with the upper and open end of the glass jar or receiving container, E, as shown at 37 in Figure 2. The upper end, 38, of the casing, C, terminates a relatively short distance below the conical top, 17, with which it is connected by means of a screen, 39, of close mesh, which, of course, extends completely around the casing, C.

For economically connecting the jar or container, E, to the casing, C, I solder or otherwise secure the top of the jar, 40, near the lower outer end of the frustroconical bottom, 14, as is clearly indicated in Figures 2 and 5. By soldering the top or cover, 40, to the bottom, 14, at intervals, as indicated at 41, relatively narrow spaces or slots, 42, are provided between their adjacent surfaces, for the purpose of permitting any vapors which may accumulate within the jar or container, E, to escape to the atmosphere. I also provide, slots between the casing, C, and the frustroconical bottom, 14, as shown in Figure 5, to allow the condensed vapor that accumulates on the inside of casing C to escape to the atmosphere. Electrical connecting plugs, 43, are of the usual and removable type to facilitate the ready placing or removal of my improved sap evaporator into and out of trees.

Having thus described the details of my invention, the operation thereof will be readily understood. The sap, entering the bore, 28, of the spile, 10, through the opening, A, in the tree, flows into the relatively shallow cup formed in the upper end of the casing, 23, which, of course, is heated by means of the heater, B. The sap then flows along the bottom, 26, around the tube, 27, to the other side of the partition plate, 30, when it enters the opening, 31, in the coil, 33, where it is further heated in its downward movement through the coil, passing out at 34, into the helically arranged trough, 35, where it is still further heated, until a sufficient amount of the water has evaporated, permitting the residue or syrup to pass downwardly through the tube, 36, and into the container or jar, E, where it is, of course, accumulated until gathered.

It will, therefore, be readily seen that a sap evaporator of this improved type may be left upon the tree with the minimum amount of care or attention, without danger of the sap freezing, souring or being diluted by rain water, and not requiring the usual methods of attachment which necessitates the notching of the tree, the syrup will, of course, be free from all chips or the like.

I claim:

1. A sap evaporator, comprising a water container, a heater mounted in the lower end of the container and spaced therefrom for a greater portion of the area, a trough associated with and contiguous to the container for heating the sap which flows therethrough, a condensing chamber in communication with the upper end of the water container, a syrup receiving container connected at the lower end of the water container, and a pipe connected between said trough and the syrup receiving container.

2. A sap evaporator, comprising a liquid container, a heater mounted in the lower end of the container, a condensing chamber located above the liquid container and in communication therewith, a coil mounted within said liquid container, a spile arranged to flow the sap into said coil, and a syrup receiving container connected at the lower end of the liquid container.

3. A sap evaporator, comprising a water container, a heater mounted in the container, a trough surrounding said water container and integrally formed therewith, a chamber connected with the upper end of said water container for evaporating the vapors therefrom, a pipe to direct the vapors which have been condensed back into the water container and a syrup receiving container in communication with the lower end of said trough.

4. In combination with a sap evaporator having a condensing chamber and a syrup receiving container, a boiler comprising a heater mounted in the lower end thereof and located below the normal water level therein, a syrup heating coil located within the boiler and above the water level and a trough located on the outer side of said boiler for further heating the sap from within the coil and in communication therewith.

5. In combination with a sap evaporator having a condensing chamber and a syrup receiving container, a boiler, comprising a heater mounted in the lower end thereof and located below the normal water level therein, a syrup heating coil located within the boiler and above the water level and a trough located on the outer side of said boiler for further heating the sap from within the coil and in communication therewith, a tube arranged to direct the water vapors into said condensing chamber and a pipe for directing the condensed vapors back into the lower end of the boiler.

6. A sap evaporator including a boiler, having a sap-receiving cup at the upper end thereof, a heater located in the boiler and adapted to heat the contents of the cup, a sap trough encircling the boiler, and a pipe connection between the cup and trough to direct the sap from the cup to the trough, said pipe connection being coiled within the boiler.

7. A sap evaporator, comprising a liquid container, a heater mounted in the lower end of said liquid container, a coil mounted in the upper end of said liquid container and communicating with the outer side thereof, a helical trough arranged on the outer side of said container and in communication with the outer end of the coil, a condensing chamber in communication with the upper end of the liquid chamber, a sap spile communicating with the upper end of the container and a syrup receiving container connected at the lower end of the liquid container and in communication with the lower end of said trough.

8. A sap evaporator including a boiler, a cup arranged at the upper end of the boiler, means for directing the sap into the cup, a pipe leading from the cup and coiled within the boiler, a sap trough arranged in helical form on the exterior of the boiler and receiving the sap from said pipe, a condenser arranged to overlie the cup and having a pipe connection with the boiler leading through and assisting in heating the interior of the cup, and means for leading the condensate from the condenser back into the boiler.

9. In combination with a sap evaporator having a condensing chamber and a syrup receiving container, a boiler, comprising a vertically mounted water receiving casing, a heater mounted within the casing of a smaller diameter than the casing and located below the normal water level, a tube arranged to direct the water vapors into the condensing chamber and a pipe for permitting the condensed vapors to flow back into the lower end of the boiler, a spile for directing the sap into the upper end of said casing, and helically arranged means for diverting the sap in a circuitous passage around said boiler, thereby forming the sap into a syrup before entering said syrup receiving container.

10. In combination with a sap evaporator having a condensing chamber and a syrup receiving container, a boiler, comprising a vertically mounted water receiving casing, an outer protective casing surrounding the vertically mounted casing, a heater mounted within the casing of a smaller diameter than the casing and located below the normal water level, an integrally formed and horizontally disposed partition plate, providing a sap receiving cup, a spile for directing the sap into said cup, and helically arranged means for diverting the sap in a circuitous passage around said boiler, thereby forming the sap into a syrup before entering said syrup receiving container.

SAMUEL C. NICHOLS.